United States Patent
Brunner et al.

(10) Patent No.: US 11,017,343 B2
(45) Date of Patent: May 25, 2021

(54) PERSONAL DATA FUSION

(71) Applicant: MODULEQ, INC., Palo Alto, CA (US)

(72) Inventors: David James Brunner, San Francisco, CA (US); Peter Taraba, San Jose, CA (US); Anupriya Ankolekar, Sunnyvale, CA (US)

(73) Assignee: MODULEQ, INC., Palo Alto, CA (US)

( * ) Notice: Subject to any disclaimer, the term of this patent is extended or adjusted under 35 U.S.C. 154(b) by 219 days.

(21) Appl. No.: 15/867,026

(22) Filed: Jan. 10, 2018

(65) Prior Publication Data

US 2018/0197127 A1 Jul. 12, 2018

Related U.S. Application Data

(60) Provisional application No. 62/444,792, filed on Jan. 10, 2017.

(51) Int. Cl.
*G06Q 10/00* (2012.01)
*G06Q 10/06* (2012.01)
*G06Q 10/10* (2012.01)
*G06F 16/951* (2019.01)

(52) U.S. Cl.
CPC ....... *G06Q 10/0633* (2013.01); *G06F 16/951* (2019.01); *G06Q 10/107* (2013.01); *G06Q 10/1093* (2013.01)

(58) Field of Classification Search
None
See application file for complete search history.

(56) References Cited

U.S. PATENT DOCUMENTS

| | | | | |
|---|---|---|---|---|
| 8,666,993 | B2* | 3/2014 | Chunilal | G06Q 30/02 707/749 |
| 9,262,528 | B2* | 2/2016 | Cooper | G06F 40/263 |
| 10,719,888 | B2* | 7/2020 | Eder | G06Q 10/0631 |
| 2003/0086536 | A1* | 5/2003 | Salzberg | H04M 3/22 379/15.02 |
| 2006/0229896 | A1* | 10/2006 | Rosen | G06Q 10/1053 705/321 |
| 2008/0281915 | A1* | 11/2008 | Elad | G06Q 30/02 709/204 |
| 2010/0205014 | A1* | 8/2010 | Sholer | G06Q 10/00 705/4 |

(Continued)

OTHER PUBLICATIONS

Jung, YoungHoon, An Alternative Approach to Information Extraction from Emails using Locally-Customized Named-Entity Recognition, May 18, 2015, International World Wide Web Conference Committee, https://sld.cs.columbia.edu/pubs/jung_www15.pdf, p. 1-11. (Year: 2015).*

*Primary Examiner* — Joseph M Waesco
(74) *Attorney, Agent, or Firm* — Perkins Cole LLP

(57) ABSTRACT

The present disclosure contemplates a variety of improved methods and systems for providing professionals and organizations tools to improve productivity and efficiency. The present disclosure includes a process for discovering and validating entity objectives. In an embodiment, the method and system receive communications from multiple data sources (e.g., email, calendar, contacts), find correlations between the communications, identify communications that appear to be important to a user, and provide relevant resources.

24 Claims, 17 Drawing Sheets

(56) References Cited

U.S. PATENT DOCUMENTS

| | | | | |
|---|---|---|---|---|
| 2012/0011170 | A1* | 1/2012 | Elad | G06Q 10/10 |
| | | | | 707/804 |
| 2012/0158601 | A1* | 6/2012 | Rothley | G06Q 10/10 |
| | | | | 705/317 |
| 2014/0316850 | A1* | 10/2014 | Peechara | G06Q 30/0201 |
| | | | | 705/7.29 |
| 2014/0351154 | A1* | 11/2014 | Guillama | G06Q 50/01 |
| | | | | 705/319 |
| 2014/0365415 | A1* | 12/2014 | Stelfox | G05B 15/02 |
| | | | | 706/21 |
| 2015/0025943 | A1* | 1/2015 | Schmidt | G06Q 10/06393 |
| | | | | 705/7.39 |
| 2015/0046233 | A1* | 2/2015 | Srulowitz | G06Q 10/06398 |
| | | | | 705/7.42 |
| 2015/0074558 | A1* | 3/2015 | Haskins | H04W 4/02 |
| | | | | 715/753 |
| 2015/0112749 | A1* | 4/2015 | Erdal | G06F 3/04842 |
| | | | | 705/7.19 |
| 2016/0071032 | A1* | 3/2016 | Hunter | G06Q 10/0631 |
| | | | | 705/7.12 |
| 2016/0132789 | A1* | 5/2016 | Flinn | G06F 40/216 |
| | | | | 706/14 |
| 2018/0084107 | A1* | 3/2018 | Aggarwal | H04W 68/005 |
| 2018/0225361 | A1* | 8/2018 | Skarin | G06Q 10/10 |

* cited by examiner

Fig. 4b

PERSONAL DATA FUSION

TECHNICAL FIELD

The following disclosure relates to personal data fusion and more specifically to the integration of data and knowledge sources to enhance workflows and communication.

BACKGROUND

People often fail to make use of resources (e.g., news articles, research reports, marketing materials, and knowledgeable colleagues) that could help achieve goals, because people are unaware that such resources exist, are unable to find them, or are too busy to search for them. Furthermore, people are often inundated with meeting invitations, phone calls, and electronic messages, particularly, though not exclusively, in the workplace. The information overload can be difficult to manage. Information overload can be especially difficult for professionals who are faced with daily challenges and changing business goals. People use sticky notes, "to do" lists, and email flags to help with productivity and efficiency. These traditional approaches are static, inflexible and time consuming, and often yield an imperfect solution.

BRIEF DESCRIPTION OF DRAWINGS

A method, system and apparatus for personal data fusion enables entities (e.g., users, organizations) to be more productive by giving them smarter tools. These and other objects, features, and characteristics of the technique introduced here will become more apparent to those skilled in the art from a study of the following detailed description in conjunction with the appended claims and drawings, all of which form a part of this specification. In the drawings:

FIG. 4b illustrates an example of a notification being displayed;

DETAILED DESCRIPTION

The present disclosure contemplates a variety of improved methods and systems for providing professionals and organizations with tools to improve productivity and efficiency. Much of modern communication is electronic (e.g., emails and instant messages). By some measures an average person receives approximately 140 business emails per day. These electronic communications hold the key to understanding the intricacies of the person's daily objectives (i.e., goals), the urgency of these objectives, and/or other contexts of these objectives. Identifying these objectives and the information about them allows the disclosed technique to provide helpful timely resources to increase productivity and efficiency. A personal data fusion system such as introduced herein enables entities (e.g., users, organizations) to be more productive by giving them smarter tools. The smarter tools include tools that identify the entity's objectives (e.g., business goals, personal goals) and provide the entity with techniques to improve workflow. In an embodiment of the personal data fusion system, the entity's objectives are automatically determined by identifying communication data (e.g., emails, instant messages) and associating the communication data with priority sets using a priority set generation algorithm. Based on the identified objectives and/or priority sets, the disclosed personal data fusion system can suggest resources and/or actions to help the entity achieve the desired objective. The disclosed techniques may also include a feedback step that allows for the determined business goals to be refined to increase accuracy.

Figure 1A:
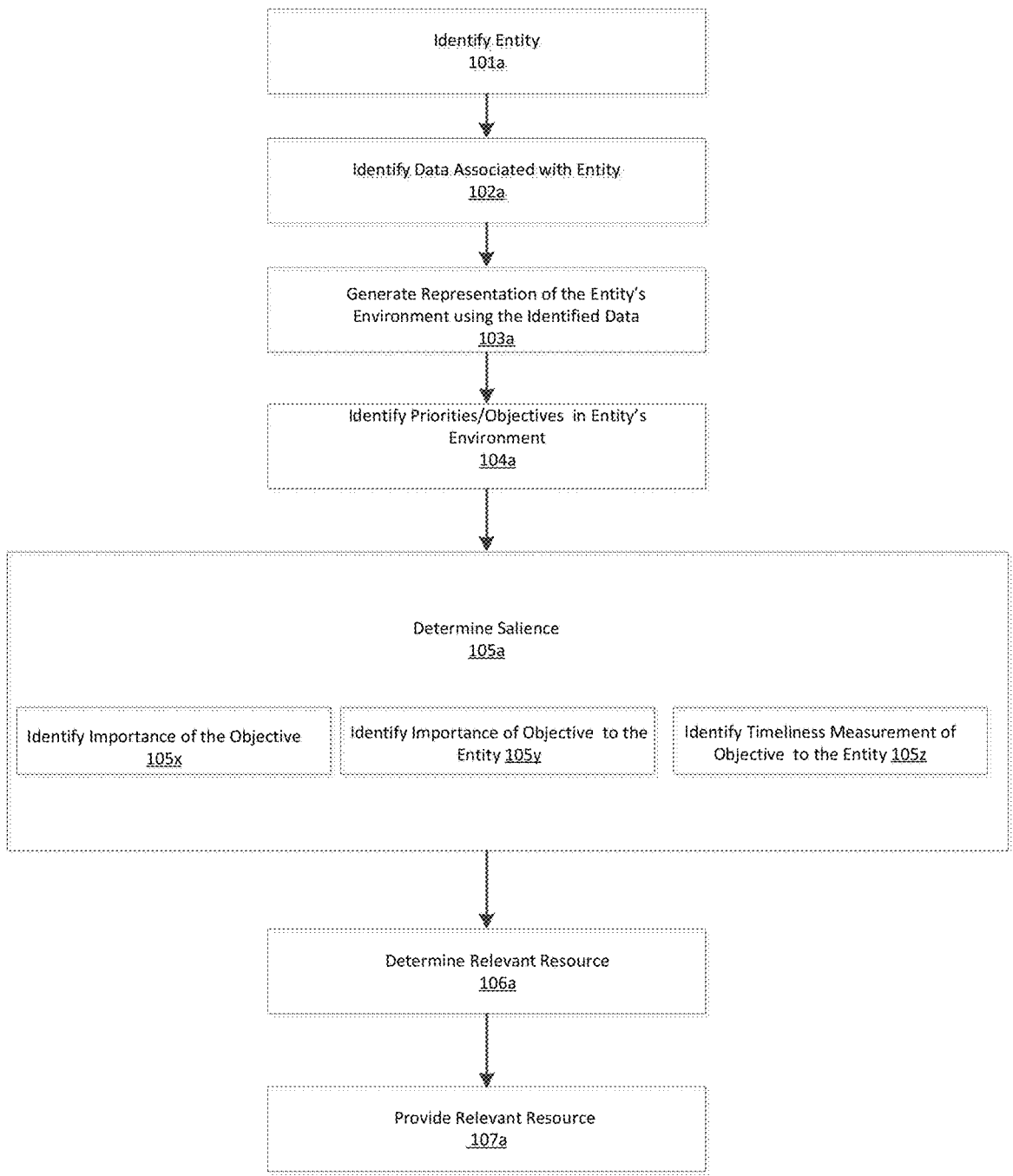
FIG. 1a illustrates an embodiment of a data fusion process.

FIG. 1a illustrates an embodiment of a data fusion process. At step 101a an entity is identified. The entity can be a person, a group of people, an organization, and/or a group of organizations. The entity can be automatically selected or identified by an algorithm. Data associated with the entity is identified at step 102a. The data associated with the entity can include, for example, communication data in electronic format, such as emails, meeting invitations, and/or chat messages. Data associated with the entity can also include information such as social media, news stories, press releases, and/or other information about an objective. For example, if the entity is a corporation, then the data associated with the entity can include relevant news stories about the corporation, its executives, and/or electronic messages of its executives. If the entity is a person, the data associated with the entity can include electronic communication such as chat messages and emails sent by and/or received by said person.

A representation or a model of the entity's environment is generated using the identified communication data at step 103a. A representation of the entity's environment can include a graphical representation of the connection between the data associated with the objectives. The graphical representation can include a knowledge graph, indicating connections between contacts (e.g., email senders, email receivers) in the electronic communication and characteristics of the contacts, such as employers and job titles. In at least one embodiment, the graphical representation includes people and organizations referenced in the communication data.

In some embodiments, the graph represents the contact communication from the point of view of the entity. In some examples, the nodes of the graph can be external contacts with whom the entity has directly interacted with, and/or those that are indirectly referenced in the interaction (e.g. body of email). The edges of the graph can link together vertices that are identified as interacting recently based on communication data, such as email correspondence and meeting invitations.

Communication patterns in the graph can be used to identify priorities. Patterns used to identify objectives and/or priority sets can include identifying vertex clusters with minimal overlap. For example, a graph which includes primarily two clustered communication patterns can be used to determine two objectives and/or priority sets. The graphical representation of the connections can identify characteristics of the interactions such as volume and time window. These characteristics can be used to identify the priorities and/or salience of the priorities.

Referring still to FIG. 1a, the generated representation can be used to identify the priorities in the entity's environment at step 104a. Priorities can include an objective, a subject of discussion, or a deliverable (e.g., a report due). In some embodiments, the connected components of the graph can represent a grouping identified as a priority. For example, if data associated with the entity indicates that a person is working on project A with several other people, project A can be identified as an objective or a priority. In at least one embodiment, multiple objectives can be identified using the representation of the environment and/or a priority set. For example, data associated with the entity can indicate that the entity is working on a very important project A and a less important project B. Both projects can be identified as objectives and/or priorities. In some embodiments, the objectives can have an associated importance value. An identified objective, in addition to the relevant contacts, descriptive metadata, keywords, topics, categories, and/or metadata associated with the objective, can be stored as a priority set.

In at least one embodiment, the objective is indicated by the entity and/or a person associated with the entity. For example, if the entity plans to acquire company ABCinc then it can set "acquiring ABCinc" as an objective. The priority set can be created based on the indicated objective. In at least one embodiment, the entity and/or a person associated with the entity can set the salience of the objective. In the example, the entity can set the salience of the objective "acquiring ABCinc" as having high importance and/or an urgent timeliness measurement.

A graphical representation created using primary email communication can include a lot of meaningless information such as advertising emails, networking emails, and/or spam emails. The graphical representation created using email communication, having a significant portion of noisy data, can generate false positives (e.g., objectives having no business purpose).

Characteristics of the determined objectives can be further analyzed to eliminate the false positives. In some embodiments, the number of organizations associated with the objective is analyzed. The organizations are determined using the email addresses of participants associated with the objective. The number (e.g., threshold or percentage) of organizations involved in the objective can be used to determine whether the objective is a true business objective. For example, if an objective is determined using a grouping of emails associated with ten organizations and no communication has more than one person from one organization, then it can be determined that this objective is a false positive. In some embodiments, the threshold percentage of communication from the entity's organization is required for the objective to be identified as valid. The threshold percentage can be dynamically updated based on the entity's feedback and/or machine learning techniques which learn the entity's environment.

In an embodiment, at step 105a the salience of the identified objective and/or priority is determined. The salience or degree of importance of an objective can include the importance level of the objective at step 105x, importance level of the objective to the entity at step 105y, and/or the timeliness measurement of objective to the entity at step 105z. For example, the salience of project A can be identified as being moderately important to the entity's organization, very important to the entity, and/or not urgent (timeliness measurement). In an embodiment, the importance level of the objective or priority is identified. The importance level can be identified based on the communication pattern identified in the data associated with the entity, urgency identifiers in the electronic communication (e.g., conversations marked with a red flag), frequency of communication, and/or contextual identifiers. In some embodiments, linguistic analysis is performed to identify important speech. Important speech can be determined by the use of specific words such as "now," and "ASAP." Some linguistic analysis algorithms can include a value for the urgency score of each word, and/or the urgency scores can be added. The aggregate urgency score can be divided by the number of words. The divided aggregate urgency score which surpasses a threshold number can be used to determine the importance level and/or salience measurement. In some embodiments, only the sentences which are associated with the identified objective are included in the importance level calculation.

In some embodiments, the importance level determination is adjusted based on information known about the entity. For example, a specific user may use urgency words frequently when he does not intend to convey urgency. A machine learning algorithm can dynamically update the urgency threshold for the specific entity (i.e., user) as more information is learned about said entity. In some embodiments, the entities are clustered with other entities based on demographic information, such as geographic location, age, industry, and/or dialect. The clusters can be used to help learn about the entity and/or the importance level which the entity intends to convey.

In at least one embodiment, an entity centric importance level is identified. For example, based on the communication data collected between three entities, it can be determined that a specific objective is a high priority or of high importance. However, it can further be determined that although the specific objective is high priority, it is only high priority to two of the three entities. For example, attorney A and attorney B are working on a litigation matter. The two attorneys have a question which they cannot answer and contact attorney C who provides an answer and does not continue involvement in the matter. If attorney C is identified as the entity 101a, from whose perspective the communication data is being analyzed, the litigation matter can be identified as an important objective but an objective having a low importance to attorney C.

Characteristics identified in the communication data can be used to identify salience and/or degree of importance. For example, communication characteristics indicating higher salience measurement include greater number of meetings, upcoming meetings with external contacts, recent past meetings and meetings with several internal and external contacts, parties in the communication having a high position at the organization, recency of communication, equal communication between all parties (contacts), internal and external involvement, high ratio of external to internal communication, short inter-communication time, and/or bursts of intense communication. Communication characteristics indicating lower salience can include no future meetings, no past meetings, meetings with a single internal and/or external contact, communication only with a fixed subset of contacts, parties in communication having a low position in the organization, low people to organization ratio, activity in distant past, purely internal or external involvement, low ratio of external to internal communication, long delays between messages, and steady, low-intensity communication. In some embodiments, each communication characteristic can have an associated weight. The weight of each communication characteristic can be unique to each entity. For example, a communication characteristic of recent activity can be identified as a very relevant characteristic when determining salience for entity A but not a very relevant when determining salience of an objective associated with entity B. Furthermore, the characteristic weight can be dynamically adjusted based on entity feedback. In at least one embodiment, a salience determination model is used to determine the salience. The salience determination model can use the communication characteristics to determine the salience measurement. The salience determination model and the weight of the communication characteristics can be dynamically updated based on feedback from the entity.

In some embodiments, the business context is determined and used to interpret importance and/or salience. The business context can be determined using information known about the organization associated with the objective such as industry type, organization size, revenue, and/or other measures of prominence such as rank (e.g., Fortune 500, Am Law 200). For example, if an objective of "acquire ABCorp" is identified and it is determined that ABCorp is a prominent company on the Fortune 500 list, then this business context can increase the importance of the objective. The industry associated with the objective can be used to determine importance. For example, if the entity is associated with several objectives and the objectives having a specific industry type (political, auto manufacturing, airline, etc.) are associated with a higher salience, then it can be determined that the specific industry type should have a higher salience when associated with the entity. In an example, if Tina is the entity and has several identified objectives having a high priority which are associated with lobbyists, then it can be determined that objectives associated with lobbyists are important to Tina. When a new objective is associated with a lobbying firm is identified for Tina, this new objective will be assigned a high priority salience measurement. In at least one embodiment, the industry type is determined for the organization associated with the entity, and relevant industry types are identified as being important to the determined industry type. For example, if the industry type associated with the entity is agriculture, then all objectives related to the industry type of grocery can be determined to be important.

In an embodiment, relevant resources are determined at step 106a. The relevant resources can be identified based on the objective and its priority to an entity. In at least one embodiment, the objective type (e.g., sales contract, business development) is considered when determining a relevant resource. For example, if an objective is a sales contract, relevant resources can include client contacts, news stories about the client, and/or reminders about emails which have not been replied to. In another example where the objective is to buy an item, the relevant resources can be services (e.g., websites, sales contacts) which sell the item.

Relevant resources can include content (e.g., news articles) and/or reminders (e.g., reminder to call a contact). For example, a sales contract can be identified as an important objective to salesperson. In the example, a relevant resource can include a reminder to email a specific person or information about a contact associated with the vendor. For example, a salesperson can be provided with a reminder to respond to an email from the potential client with information the potential client requested. The salesperson can also be notified about a relevant news development, such as an acquisition of the potential client.

In an embodiment, the relevant resource is provided to an entity and/or a contact associated with an entity at step 107a. In at least one embodiment, the relevant resource can be provided via an alert, text, email, and/or notification. In some embodiments, the entity situational context can be analyzed to determine the appropriate moment when the relevant resource should be provided.

In an embodiment, the objective is set by a system user. For example, an entity's manager sets an objective for the entity. In one embodiment, the relevant resources can be provided to a party that is not the entity. In an example, an objective for every entity can be set to have a productivity objective. When an entity is not meeting the objective, a relevant resource, such as an alert, can be triggered and sent to a supervisor. If the entity is a division in a company, the relevant resource can be provided to a key person.

In at least one embodiment, the objective can be determined using machine learning. A determination can be made about the determined objective as to whether it's negative and/or against company policy. For example, a negative objective can be an insider trader objective. Relevant resources, such as a notification or an alert, can be transmitted to a relevant party like a supervisor.

Figure 1B:
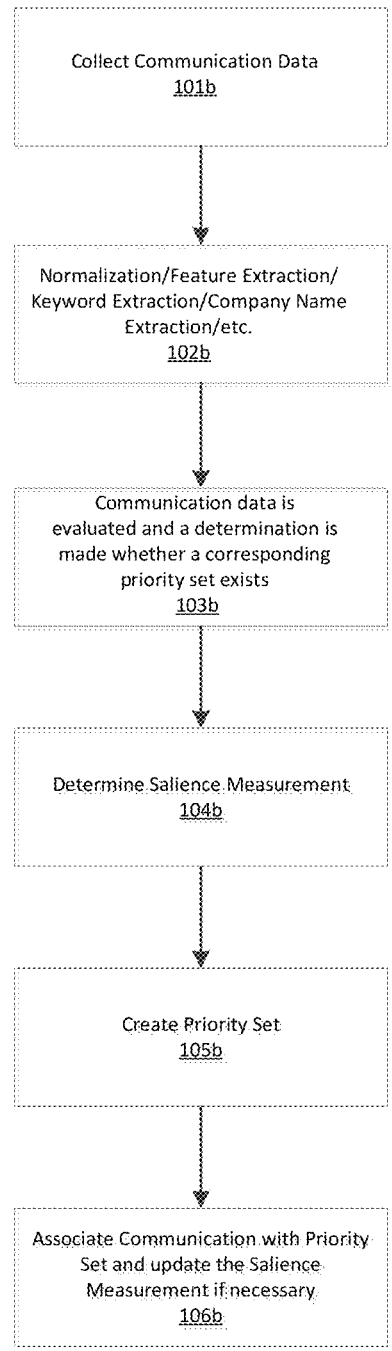
FIG. 1b illustrates an embodiment of a priority set generation process.

FIG. 1b illustrates an embodiment of the priority set generation process by the data fusion engine. In step 101b, each user's communication data is collected. Communication data is collected from one or more sources, including email databases, phone system databases, facsimile system databases, social media accounts, meeting and conferencing databases, docket management systems, and/or Microsoft® Office servers. Communication data can collect data in electronic format such as an email, a text message, a chat message, a phone call, a voicemail, a social media communication, a facsimile communication, a meeting, a new docket management entry, and/or a CRM record. The communication data can be collected by monitoring one or more sources.

Communication data collected can be specific to an entity such as a user, an organization, a project, a matter, a team, and/or a transaction. The communication data can be initially stored in a document-oriented database, such as MongoDB. Then after normalization transformation, it can be stored in, for example, a SQL table. At step 102b, data is normalized by removing data determined not to be relevant. Data, such as the body of an email, can be determined not to be relevant. Significant properties can be extracted, such as email addresses, external email domain, names, titles, addresses, subject, receiver and/or sender's internet protocol (IP) address, receiver and/or sender's MAC address, priority information, Twitter® handles, phone numbers, company names, keywords, language, message length, attachment size, signature blocks, information such as whether the email was part of an email exchange and its chronological place in the exchange, and/or other data deemed relevant.

The data normalization process can include determining a relationship between data records. The objective and/or goal of the entity can be derived using machine learning and/or classification algorithms. For example, a sales objective can be identified if a threshold number of people associated with the priority set and/or communication have a job title related to sales. Classification information can be determined for each communication. The data normalization process can include creating one or more keyword vectors, creating one or more feature vectors, and/or extracting at least one facet from each communication.

In an embodiment, the communication data is normalized 102b. Normalization can be performed to group emails from one person having multiple email address. In an embodiment, once an email address is identified, the domain can be parsed to determine whether it is external. Normalization can include grouping multiple email address from one organization. For example, an email communication between tina@ABCorp.com, tom@ABCorp.com, and lisa@ZYCorp.com can be analyzed to determine that two out of three people involved in the communication are from the ABCorp organization. In at least one embodiment, a communication determined to not include an external email address and/or external contact is not further analyzed and is determined not to be relevant.

The received communication data can be represented by a new objective or an objective which has been previously determined. At step 103b, a determination is made as to whether an objective and/or an associated priority set already exists. The priority set can include a grouping of the objective, salience, associated contacts, and/or entity. In at least one embodiment, the determination of whether an objective exists is made by comparing contacts associated with a priority set with communication data participants. In an embodiment, a machine learning and/or clustering algorithm determines whether the communication is associated with a preexisting priority set. If such a priority set is determined to exist, then the communication is added to the priority set as described in FIG. 2. If no matching priority set exists, then a priority set is created. The priority set includes one or more of the domains, the identified person associated with the communication, objective, classification, keywords, features, and/or facets.

The machine learning algorithms can include one or more clustering algorithms used to generate priority sets and determine whether incoming communication data is associated with previously generated priority sets. In an embodiment, machine-learning algorithms such as decision tree learning, association rule learning, powered outer probabilistic clustering algorithm, artificial neural networks, deep learning, inductive logic programming, support vector machines, clustering, Bayesian networks, reinforcement learning, representation learning, similarity and metric learning, rule-based machine learning, and/or learning classifier systems can be implemented to generate priority sets.

In an embodiment, machine learning is performed by a powered outer probabilistic clustering (POPC) algorithm to create priority sets. The POPC algorithm relies on computing discounted probabilities of different features belonging to different clusters. The POPC algorithm can incorporate a clustering algorithm to cluster communication data. In at least one embodiment, the clustering algorithm is a k-means algorithm. The clustering algorithm can be used to cluster the communication data into a relatively large number of clusters, possibly half as many as the number of data records. After the communication data is clustered, the POPC algorithm attempts to reassign each communication data record to each of the other clusters and checks whether an optimization function increases as a result. If the optimization function increases, then the reassignment is preserved; otherwise, the reassignment is reverted.

The performance of the POPC algorithm is sensitive to the design of the optimization function. In embodiments of the POPC algorithm with a feature learning component, the optimization function can use the sum over the communication data's features of the powered outer probability that a given feature belongs to a given cluster. Using the powered outer probability with a power greater than 1, favors assignment of data samples to clusters that maximize the probability that each feature is present in only one cluster. The reassignment process continues until the optimization function stops increasing. Typically, the reassignment process will result in the number of clusters decreasing until it reaches a number that accurately reflects the organization of the underlying data. This usually represents a local maximum, since the global maximum is achieved by the degenerate case in which all communication data records are in a single cluster. Empirical and simulated entity communication data shows that the POPC algorithm reliably stops at a local maximum that corresponds to the number of meaningful priority sets in the data sample. In an embodiment, the POPC algorithm can be modified to determine whether communication data is associated with a priority set, to derive importance level, to determine objective, to determine relevance of a news article, and/or to group news articles.

In at least one embodiment, if it is determined that a matching priority set does not exist, the user is prompted at step 104b to determine an associated salience measurement with communication and/or priority set. In at least one embodiment, the priority set and/or the salience measurement is identified by the user. The salience measurement prompt can be presented to a user via chatbot, email, mobile notification, pop-up window, communication, and/or other notification types. The prompt can include text such as "You just scheduled a meeting with Tom Jones from ABC Ventures. Do you want me to send you updates about ABC Ventures?" The graphic user interface can be set to allow the entity to respond to the response via free text format and/or click on a button associated with the question. Valid responses can include "yes," "no," and "ask again later." In an embodiment, the answer to the prompt request can include degrees of priorities such as one or more of "critical matter," "urgent matter," "high priority," "medium priority," and/or "low priority." The new priority set is created, which can include associated communications, priority labels, links to people, links to organizations, other attributes, and/or an associated importance level.

In an embodiment, the salience measurement and/or the importance level of the communication is determined without the entity's intervention, and the priority set (i.e., objective) is created with the associated derived importance level of the communication. The communication importance level can be identified by keywords in the communication that demonstrate urgency, such as "lead," "opportunity," "deadline," "urgent," "ASAP," or "final deadline." The importance level of the communication and/or priority set can be derived using and referencing tracked keywords, domain names, phone numbers, titles, company names, keywords, features, facets, machine learning, clustering, and/or classification algorithms.

In at least one embodiment, the entity is prompted to determine whether the derived salience measurement and/or importance level associated with the priority set is correct. The salience measurement can be determined using a predictive model. In another embodiment, an entity is presented with an option to update the salience measurement of the priority set. Based on the entity's feedback, the predictive model can be updated to increase accuracy.

At step 105b, the priority set is generated with the associated communication and the priority set having an associated importance. In at least one embodiment, the generated priority set does not include an associated salience measurement. In further embodiments, step 105b precedes step 104b, and the importance level is determined after the priority set is generated. The created priority set can be associated with a team of people. In an embodiment, the involvement levels of people included in the communication associated with the priority set may be computed, and/or association of the priority set with a team may be determined based on the person's involvement levels. The team associated with the priority set can be created automatically.

Figure 1C:
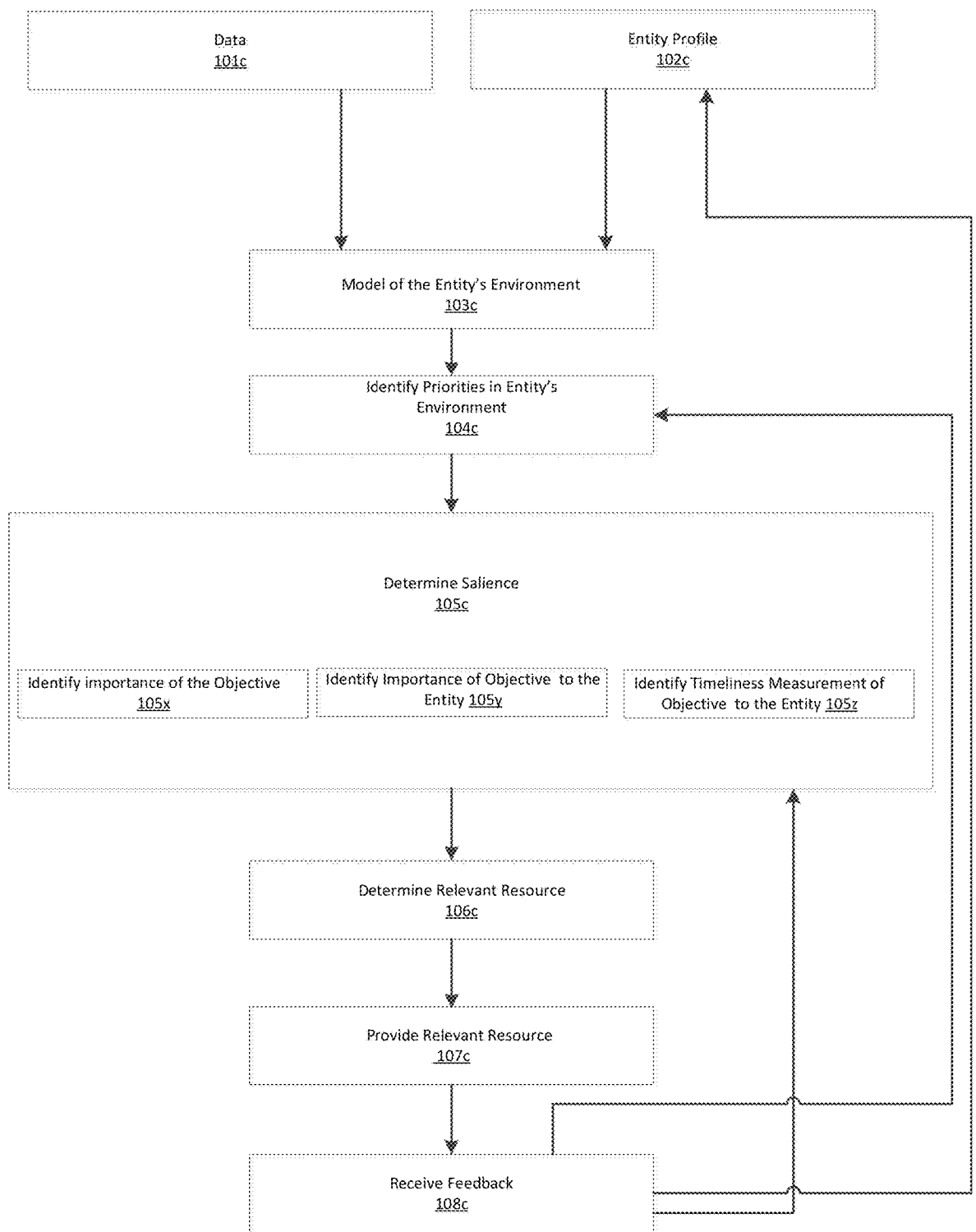
FIG. 1c illustrates an embodiment of the machine learning process to optimize performance.

FIG. 1c illustrates an embodiment of the machine learning algorithm process to optimize performance. An entity's environment can be modeled 103c based on received data 101c and/or entity profile. The received data can be any data that can help model the entity's environment such as electronic communication, and/or organization charts. In an embodiment, using the environmental representation, the objectives in the entity's environment is identified 104c. The salience measurement 105c of the objectives can be determined. Relevant resources 106c associated with the objectives can be identified. The relevant resource 107c can be provided to the entity and/or an associated user.

In at least one embodiment, the entity and/or a user can provide feedback 108c. The feedback can include a quality rating of the relevant resource. Furthermore, the feedback can include an explanation associated with the reasons why the resource was helpful and/or not helpful. In some embodiments, the explanation can include feedback on the timeliness (e.g., received too late, received too early) of the feedback. In at least some embodiments, the feedback is textual, and/or the text can be analyzed to derive the meaning of the feedback.

In some embodiments, feedback is determined by the receiver's interaction with the resource. For example, if a resource is shared, it can be determined that the resource is relevant. If the resource is viewed less than a threshold period (e.g., 15 seconds) it can be determined that the resource is not relevant. In some embodiments, the content associated with the shared resource can be analyzed to determine whether the source is relevant. For example, if in response to receiving a resource the entity shares the resource with an associated text "wow this is a very relevant document", then it can be determined that the resource is relevant. If in response to receiving a relevant resource to the entity shares the resource with associated text "Wow this is a really weird and irrelevant document. I can't believe the system suggested this to me. Ha!", then it can be determined that the resource is very irrelevant.

The received feedback can be used to update the salience determination model, the entity environment determination model, the objective determination model and/or update the entity profile. The received feedback can be feedback at the relevance of the provided resource, the determined objective, the method of providing a resource (e.g., notification, alert, email), and/or the timing of the provided resource. If, for example, the presented relevant resource is a suggestion to respond to an email, the feedback from the entity can include the text "I didn't think this resource was relevant. The email to which you told me to respond had nothing to do with my current professional goals. Even if it was relevant, I don't like being interrupted while I am on an email chat." The feedback can be analyzed and used to determine that the resource was not relevant or a high priority objective, and/or the entity prefers not to be interrupted during chats. In the example, the feedback can be used to update the entity profile with settings indicating that the entity does not want to be interrupted during chat. Furthermore, the salience determination model can be updated in response to the feedback. To update the salience determination model, the previous determination can be analyzed to determine which factor requires an update in response to the user feedback. Similarly, the objective determination model, and/or the environment determination model can be analyzed to determine which factor requires an update in response to the user feedback.

Figure 1D:
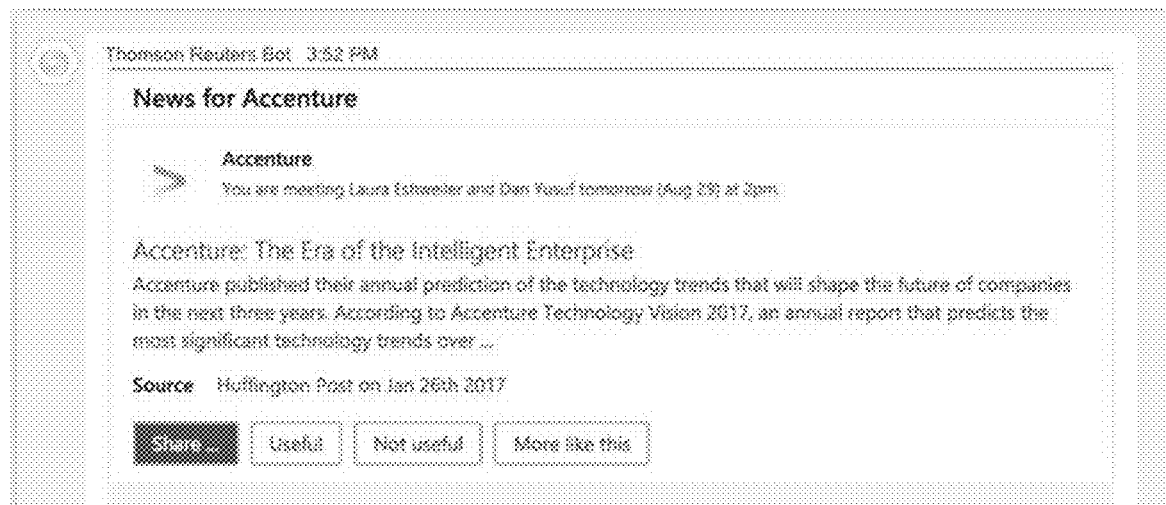
FIG. 1d illustrates an example of collecting entity feedback.

FIG. 1d illustrates an example of collecting entity feedback. The example described in FIG. 1d is determined by identifying a group of users intending to attend a meeting associated with Accenture. The relevant resource provided to the entity is a news article. In response to receiving the relevant resource, the entity can share the article and/or rate it is as useful or not useful. The entity can also respond with a request for "more like this" in order to access other similar or related resources. That information about the user's response can be collected and used to update the relevant models such as the objective determination model, salience determination model, and/or relevant resource determination model.

Figure 2:
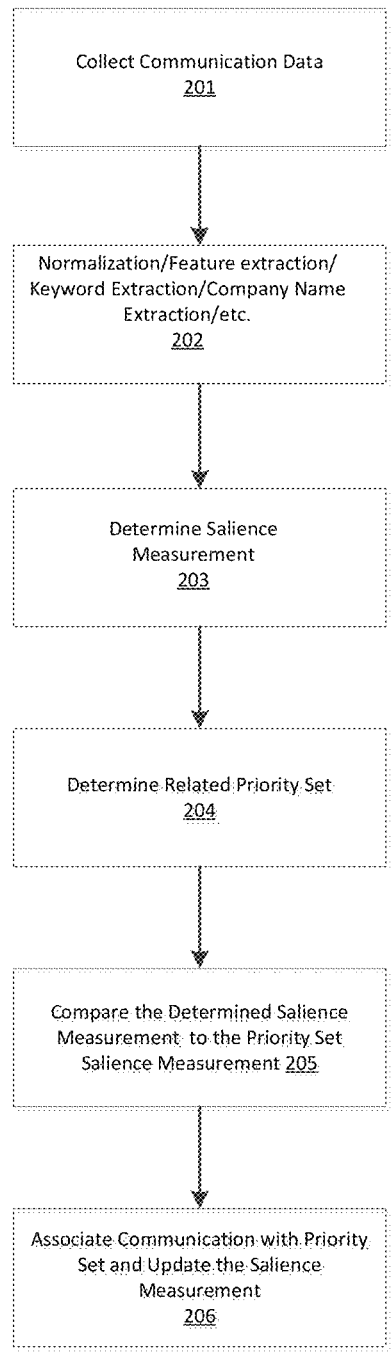
FIG. 2 illustrates an example of a priority set update process.

FIG. 2 illustrates an example of the priority set update process. The data fusion engine can capture communication data at step 201. At step 202, the communication data is normalized, the appropriate features are extracted. Features extracted can include the company name, names of participants, and/or other relevant information are identified. At step 203, the salience measurement of the communication is determined. The communication salience measurement can be identified by keywords in the communication that demonstrate urgency such as "lead," "opportunity," "deadline," "urgent," "ASAP," and "final deadline." The salience measurement of a communication can include referencing tracked keywords, domain names, phone numbers, titles, company names, and/or tags by the entity.

The salience measurement of the communication can include determining whether the sender of the communication being identified is an important person. The information used to determine importance level can include querying an external data source such as LinkedIn, Wikipedia, and/or the company directory of the external domain. Person can be identified as an important person by a reference list associated with an entity and/or a reference list associated with that person's employer.

The salience measurement or degree of importance can be determined using a machine learning algorithm at step 203. Machine learning algorithms such as decision tree learning, association rule learning, artificial neural networks, deep learning, inductive logic programming, support vector machines, clustering, powered outer probabilistic clustering algorithm, Bayesian networks, reinforcement learning, representation learning, similarity and metric learning, rule-based machine learning, and/or learning classifier systems can be implemented in the evaluation step to determine importance.

At step 204, the priority set to which the communication relates is determined. The determination can be made by matching one or more extracted features, keywords, participant names, and/or company names. In an embodiment, the determination is made using a classification algorithm and/or artificial intelligence. Once the communication and the associated priority set are identified, the salience measurement is compared at step 205. If the importance level associated with the priority set is lower than the importance level of the communication, the entity can be prompted to determine whether the importance associated with the priority set needs to be adjusted. The salience measurement reconciliation prompt can be presented to a user via chatbot, email, mobile notification, pop-up window, communication, and/or other notification types. In at least one embodiment, the salience measurement profile associated with the priority set is automatically adjusted.

The communication data associated with the priority set can be analyzed to determine salience measurement, objective, and/or goal. The entity's job title can be used in conjunction with communication data information to determine objective and/or goal. Relationships between email exchanges and calendar events can be identified. In an embodiment, an entity extraction algorithm can be used. Information such as organizational charts, company websites, records in corporate databases like Customer Relationship Management systems, records obtained from third-party vendors like Dun & Bradstreet or S&P, Wikipedia, and LinkedIn profiles can be used to identify information about participants, organizations, and subjects, and therefore can be used to determine the objective, goals, and/or importance level. The objective of the priority set can include the subject of the interaction and/or the goal of the entity. For example, a communication with a Procurement Officer from a large corporation can be identified as having a high importance, and an association can be made to determine that the communication is related to a sales objective. A communication with a CEO of a Fortune 500 company can be identified as having high importance. The salience measurement can be identified by frequency of interactions/communications, time elapsed between messages and corresponding replies (shorter time intervals implying greater importance), titles of people involved, entity's position on email thread (to, cc, and/or bcc), position on calendar invites (required and/or optional attendee), priority tags, keywords, machine learning, and/or classification algorithms.

Figure 3:
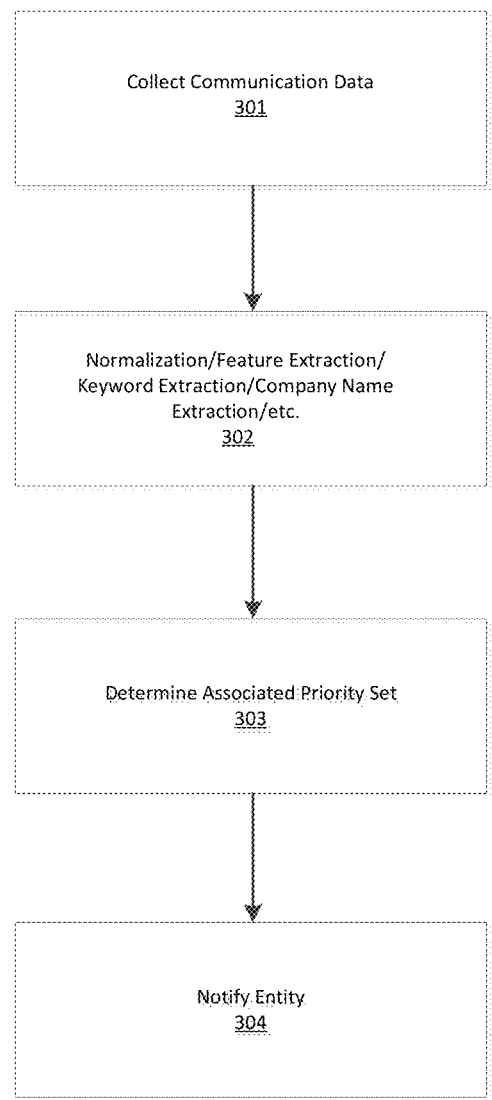
FIG. 3 illustrates an example of the entity notification process.

FIG. 3 illustrates an example of the entity notification process. Communication data is collected at step 301, which is similar to the process described in step 101b. The communication can be collected by monitoring one or more sources. At step 302, the communication data can be processed as demonstrated in step 102b of FIG. 1b. The determination is made at step 303 on whether the communication is related to an existing priority set. Once it is determined that the communication is related to the priority set, the priority set configuration determines an action. The priority set configuration information notification determination can be based on the goal, objective, user setting, importance, and/or data associated with the priority set. The actions can include a notification 304 being generated, a scheduled alert, and/or a timer being initiated. The actions can be displayed on a dashboard and/or the priority screen. In an embodiment, the alert is sent to a user via chatbot, email, text message, and/or electronic notification. The action taken can include notifying all of the team members, the entity's supervisor, and/or the entity.

Figure 4A:
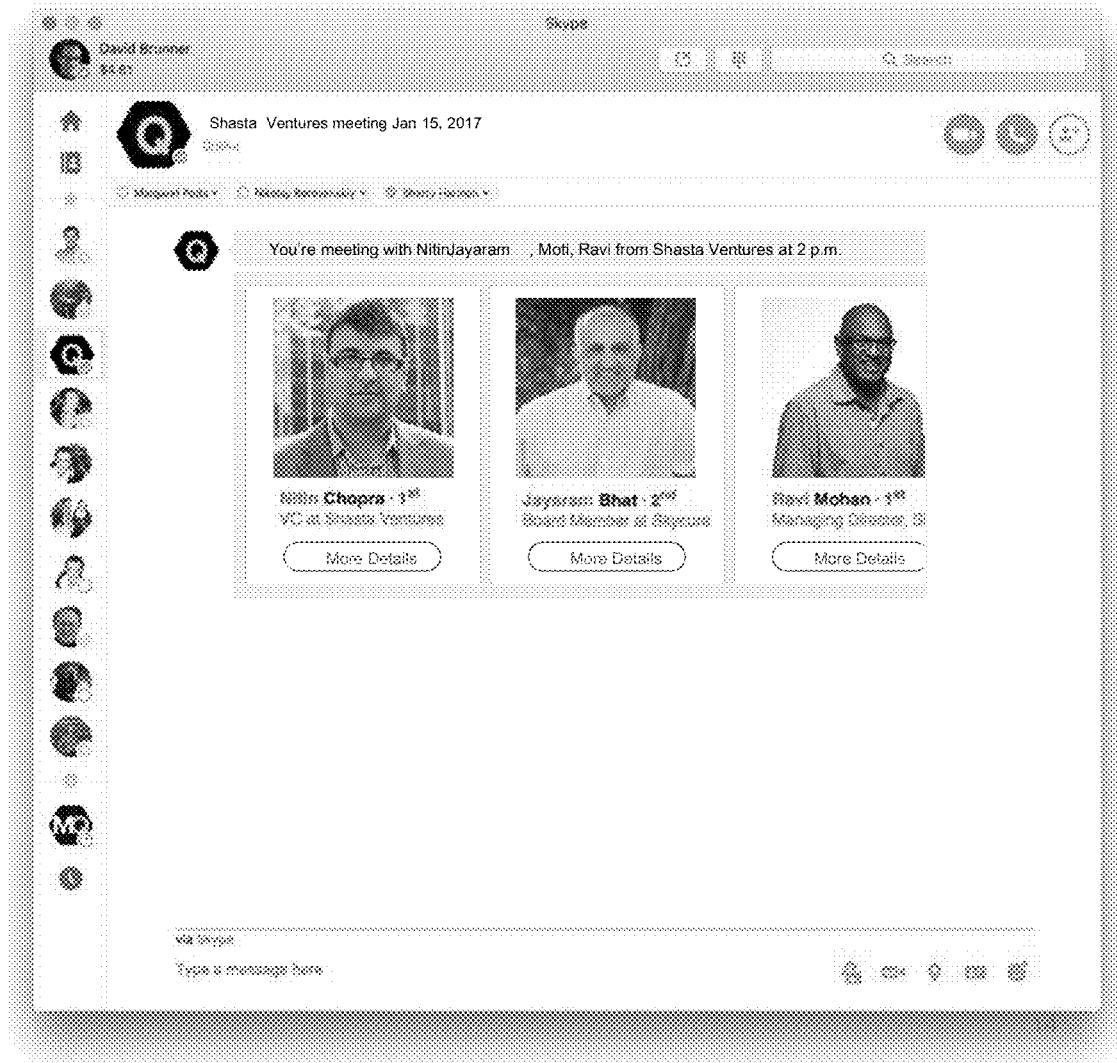
FIG. 4a illustrates an embodiment of a displayed alert.

FIG. 4a illustrates an example of a notification being displayed prior to a scheduled meeting. In the instant example, the notification is displayed to an entity (e.g., user named David). The relevant resource displayed is the information about attendees of the meeting.

Figure 4B:
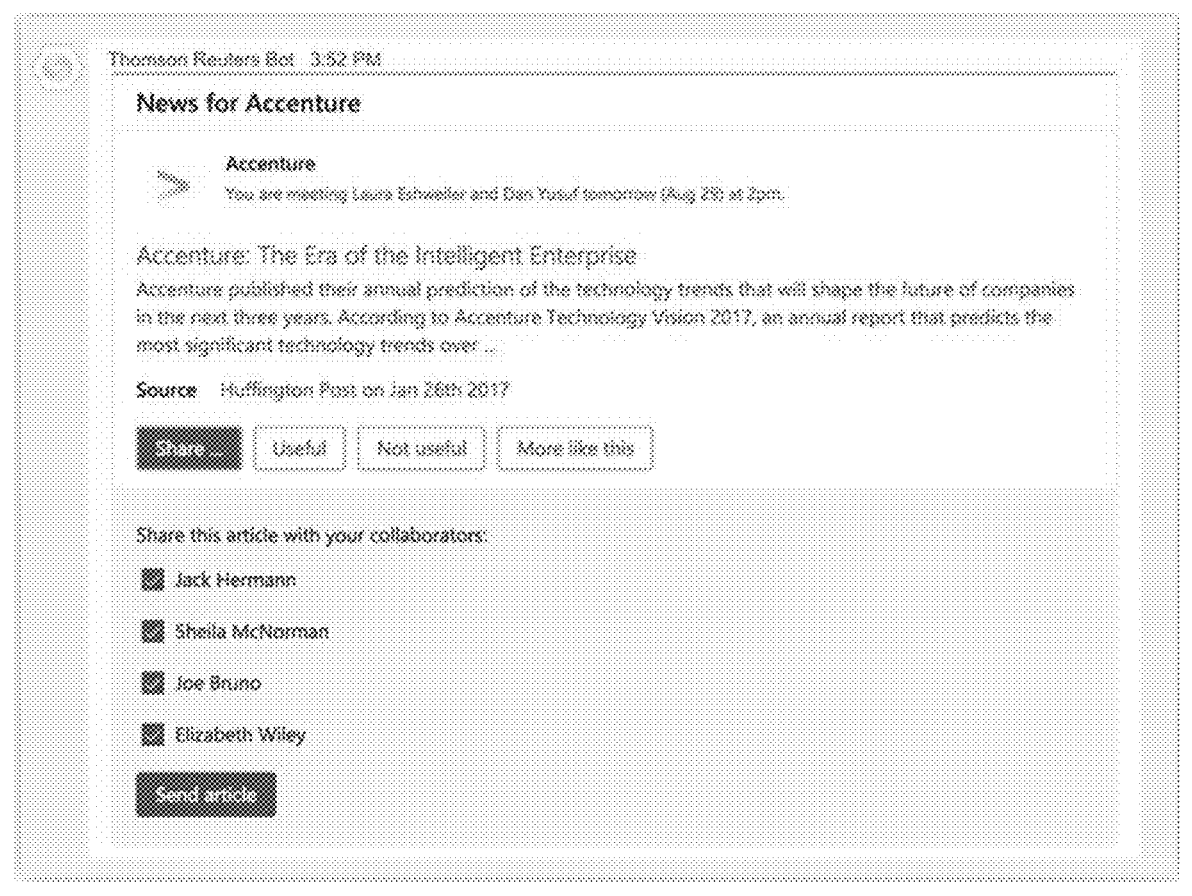

FIG. 4b illustrates an example of a notification being displayed. In the example, a news article is determined to be relevant to a priority set. The news article resource is displayed to the entity. The entity is provided an option to share the relevant resource with contacts associated with the priority set. Additionally, the entity is provided an option to provide feedback as to whether the resource was relevant.

Figure 5A:
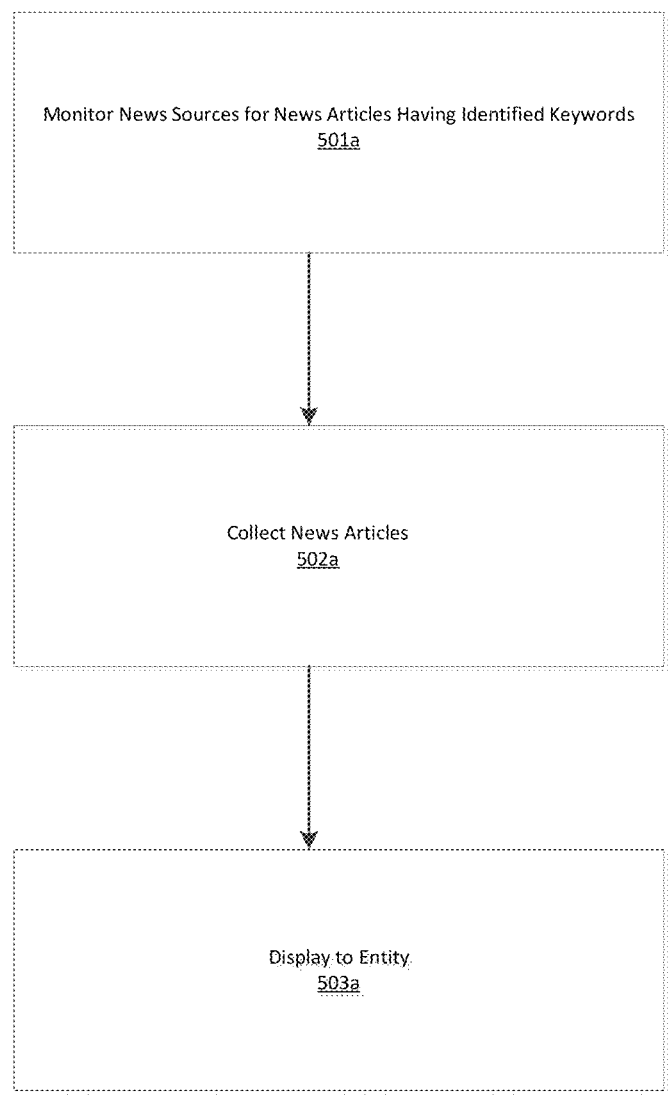
FIG. 5a illustrates an embodiment of the news monitoring feature.

FIG. 5a illustrates an embodiment of the news monitoring feature. Priority sets can be configured with identified keywords for which the entity is interested in receiving news information. The identified keywords can include company names, names of participants, topics and/or names of key participants. The news monitoring feature can be configured to monitor news sources 501a for the appearance of identified keywords. The monitored news sources can include news websites, social media websites, public records databases, and/or other informational sources. The news articles matching the identified keywords can be identified 502a and displayed 503a to the entity via an alert and/or a notification. In some embodiments, the news monitoring feature can identify multiple news articles and display only one news article per news event. The one news article can be selected by using a ranking algorithm to determine the best quality and/or best rated news article. The news monitoring feature can further include a functionality that identifies news events by clustering and/or classification. In an embodiment, the alert is sent to an entity via chatbot, email, text message, and/or electronic notification. Depending on the configuration, the alert can be sent to the team members, the entity's supervisor, and/or the entity. In another embodiment, the entity is prompted to determine whether the news feature should continue to be enabled for the priority set.

Figure 5B:
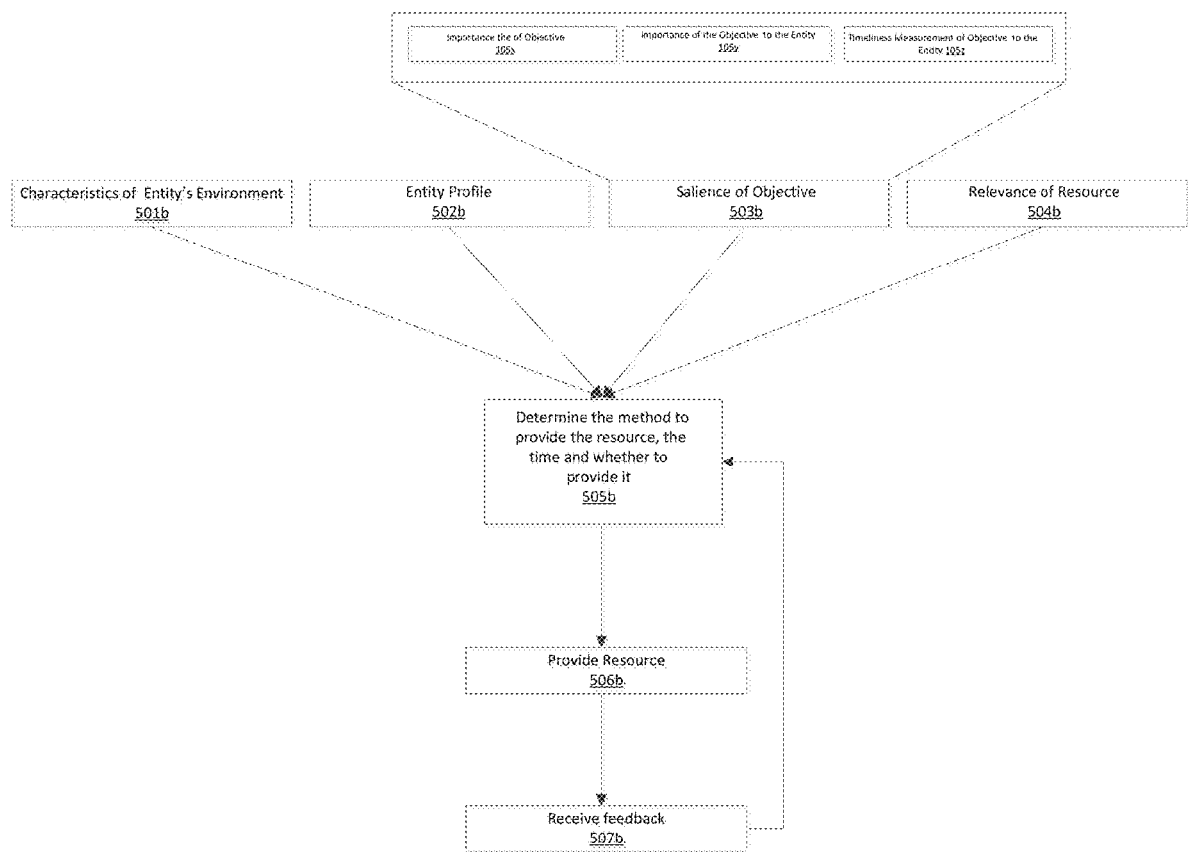
FIG. 5b illustrates an example of determining how the relevant resources are provided.

FIG. 5b illustrates an example of determining how the relevant resources are provided. Characteristics of an entity's environment 501b can be determined. Characteristics of an entity's environment can include information about the environment (e.g., objectives of entity's organization, network topology), relationship graph of other entities in the environment (e.g., organizational graph, graph indicating interactions), and/or the activity presently being performed by the entity (e.g., using chat, streaming video).

Information about the entity (e.g., demographic information), and/or entity preferences (e.g., preferred method of notification) can be identified using the entity profile 502b. In some embodiments, the entity profile can include entity characteristics such as information including previously identified objectives and/or priority sets, entity's position in the organization, entity's close contacts, entity's professional plans, relevant resource notification preferences (e.g., alerts, emails, pop-ups), entity feedback from previously identified objectives and/or relevant resources, and communication data characteristic weights. The entity characteristics identified in the entity profile can be used to determine entity objectives. In at least one embodiment, the entity can be associated with a list of objectives and an associated priority of said objectives (e.g., high importance, low importance).

The salience of the objective 503b can include the importance of objective 105x (e.g., urgent), the priority of objective to the entity (e.g., urgent), and/or a timeliness measurement (e.g., requires immediate redress). In at least one embodiment, the importance of the objective can include the objective (i.e., unbiased, actual, factual), importance level of the objective, and the importance of the objective to the entity can be a subjective measurement of the importance. For example, while objective of "stopping crime" can be a very important objective in an organization, it may be a low importance objective to an entity who is an accountant that works for the organization.

The characteristics of entity's environment, entity's profile, salience of objective, and/or relevance of resource can be used to determine whether to provide the resource 505b, the way the resource is to be provided (e.g., alert, notification, email, text), and/or the moment the resource is to be provided (e.g., provide to entity now, provide to entity in three minutes, provide to entity once the stress level of the entity is identified as being moderate or lower). The determination is made regarding when the resource can be provided to the user 506b in accordance with the determine parameters. The entity's feedback 507b can be analyzed and used to update the determination model 505b.

Figure 5C:
FIG. 5c illustrates modules of the data fusion system.

FIG. 5c illustrates an example of the functional components of the data fusion system. Communication data collection module 501c can be configured to collect data associated with an entity. An objective determination module 502c can determine an objective based on the collected communication data. The salience measurement determination module 503c can determine the salience of the objective using the collected communication data. The priority set identification module 505c can determine whether a priority set associated with the determined objective exits. In some embodiments, the priority set identification module 505c uses the objective, the contacts associated with the objective and/or the salience measurement to determine the whether an associated priority set exists. The priority set creation module 504c creates a priority set using the determined objective, and/or salience measurement. The relevant resource identification module 506c determines relevant resources based on the objective. In some embodiments, the relevant resource identification module 506c determines the relevant resources using entity characteristics. The feedback collection module 507c collects user feedback (e.g., user provided feedback, user behavior). In some embodiments, the feedback collection module 507c can provide feedback to the objective determination 502c, the salience measurement determination 503c module, and/or relevant resource identification module 506c. In response to receiving feedback information the objective determination 502c, the salience measurement determination 503c module, and/or relevant resource identification module 506c can update the determination algorithm to increase accuracy.

Figure 6A:
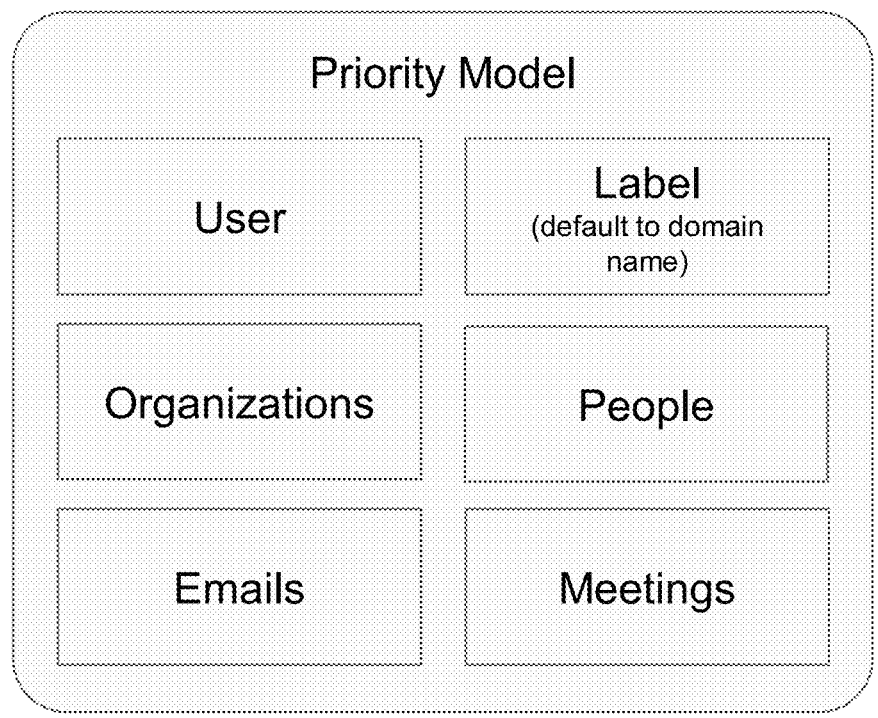
FIG. 6a illustrates a priority model.

FIG. 6a illustrates an example of the structure of the priority model. The priority model is a priority set which can include associated users, labels such as features, keywords, external domain names, organizations, people including participants, and communications such as emails and meetings. In an embodiment, each priority set can be associated with an importance level such as "high priority." Each importance level can include a salience measurement profile setting. The salience measurement profile setting can dictate the frequency and/or type of notification related to the priority set to the entity and/or team. The preferred frequency and/or type of notification can also be configured for each priority set. The salience measurement profile can be manually configured by the entity or by the employer, preconfigured by the vendor, and/or determined by a machine learning algorithm. In an embodiment, the salience measurement profiles can include one or more priorities of "critical matter," "urgent matter," "high priority," "medium priority," and/or "low priority." In another embodiment, the frequency of notification increases based on the importance. The priority set can also have one or more timers associated that log time elapsed between responses to received communications and/or sent communications. The priority set can be associated with an entity and/or a team of entity's. In at least one embodiment, the objective and/or importance level determine the frequency and/or type of communication.

Figure 6B:
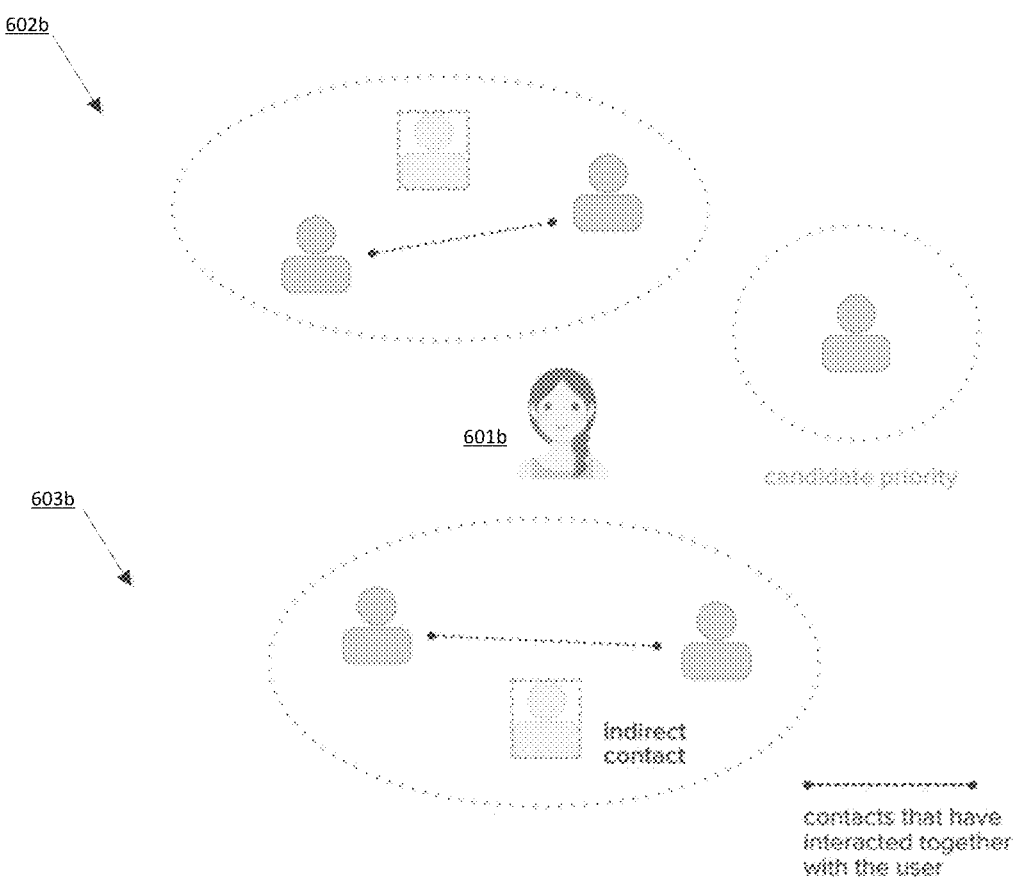
FIG. 6b illustrates a technique to map an entity's environment.

FIG. 6b illustrates a technique to map the entity's environment. In response to an entity 601b being identified, the user centric graph can be generated. In at least one embodiment, the user centric graph is generated using contact information of objects (e.g., users, contacts) associated with the entity. The graph of the entity's environment can exclude the connections to the entity as shown in the figure. The graph can show two distinct and separate communication patterns. The separate communication patters can form subgraphs 602b and 603b. The subgraphs can be used to identity separate objectives and/or priority sets. The communication data associated with a subgraph can be analyzed to determine an objective. In some embodiments, the contacts (e.g., collaborators) associated with the subgraph are identified. The identified objective and/or contacts can be used to generate a priority set and/or identify an already created priority set.

Figure 7:
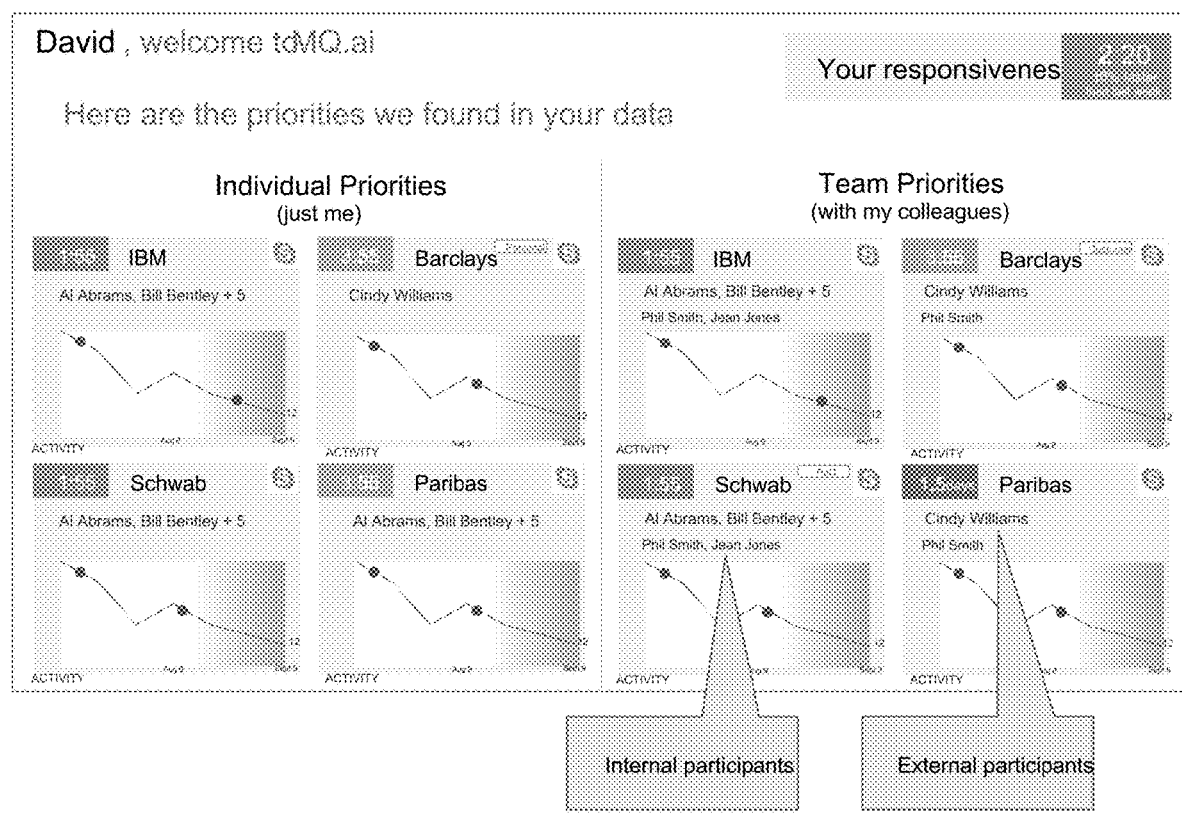
FIG. 7 illustrates the data fusion graphic user interface.

FIG. 7 illustrates an example of the data fusion graphical user interface. An entity using the data fusion method and/or system can have associated entity accounts. An entity account can be associated with the entity, and the entity can be authenticated and granted access to resources. Authentication can include passwords, biometric authentication, and/or single sign-on. An entity profile associated with the entity account can be associated with the entity's priority sets. The entity profile or user profile can be associated with one or more teams and/or organizations. In an embodiment, an entity can customize a list of keywords and/or other data found in communications that indicate a high priority. In at least one embodiment, the entity can review the priority sets and/or edit information associated with the sets. For example, priorities can be edited to change the designation to/from a personal priority set from/to a team priority set.

Figure 8:
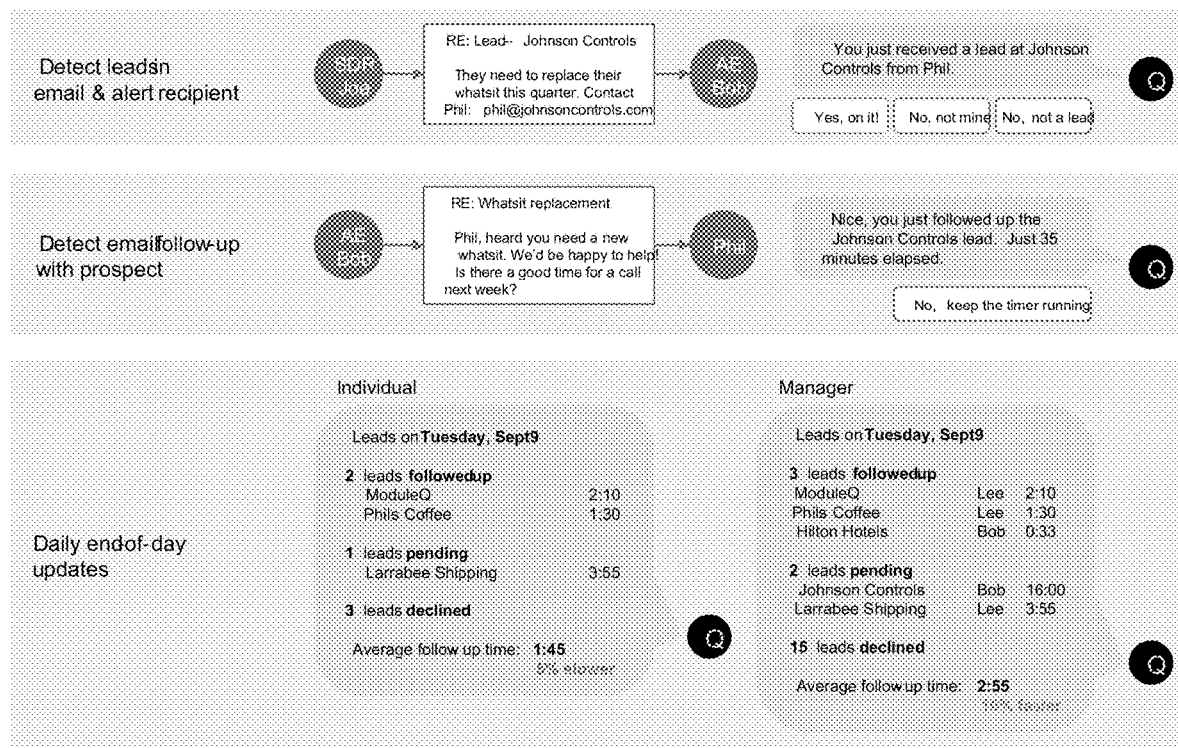
FIG. 8 illustrates a status report.

Status reports can be generated on a dashboard as shown in FIG. 8. The status reports can include data flow statistics, such as the number of communications captured per user and/or team. The status report can additionally include "end of day" reports, including activity reports of priority sets per user and/or team as shown in FIG. 8. A "priorities screen" can also be presented to the user, as shown in FIG. 7. The priorities screen can include priority sets per user and/or team, with associated status information such as response time, participants, and/or activity charts. An administrator may configure the method/system to designate teams, including team members, to create/delete entity accounts, to change passwords, to configure status reports and/or priority screens viewed by users, and/or to designate relevant keywords and/or relevant features.

Figure 9:
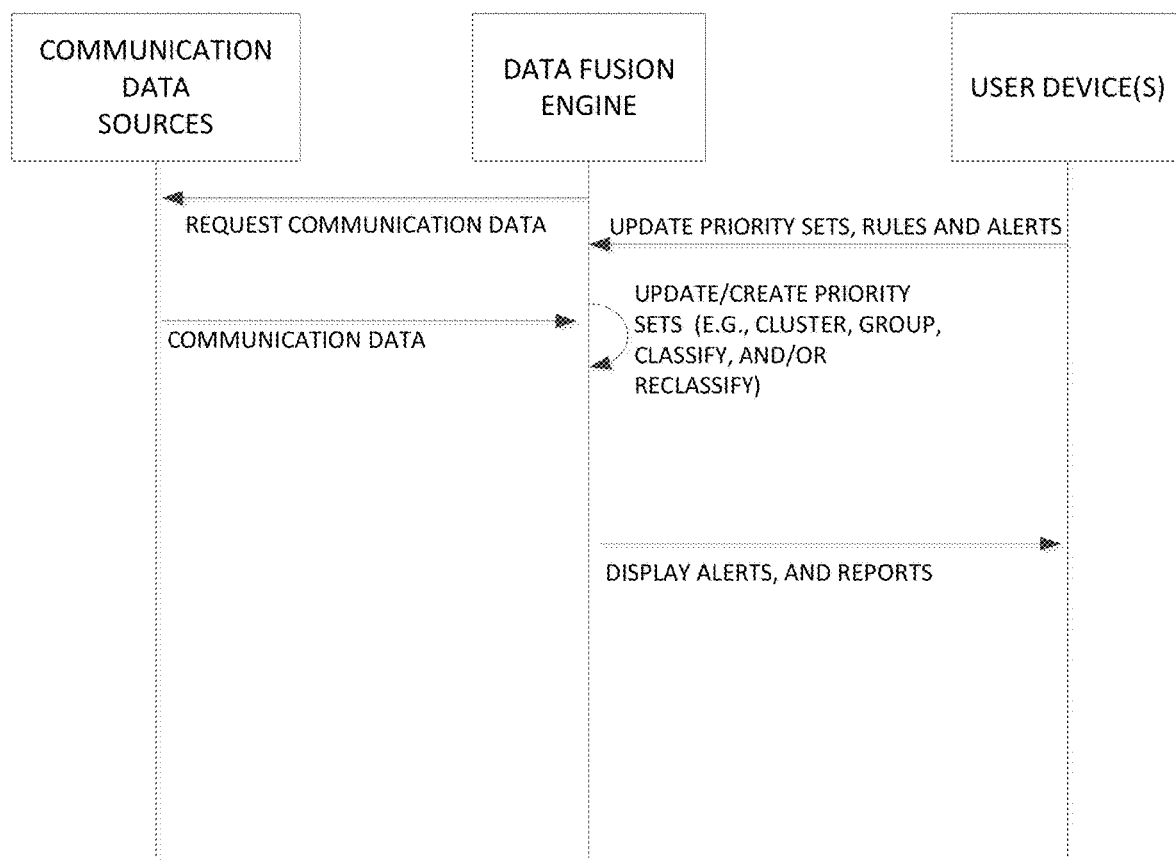
FIG. 9 illustrates a workflow of the data fusion system.

In FIG. 9, the sequence diagram illustrates the workflow of the data fusion system. The diagram illustrates the communication between communication data sources, the data fusion engine, and/or user devices.

Figure 10:
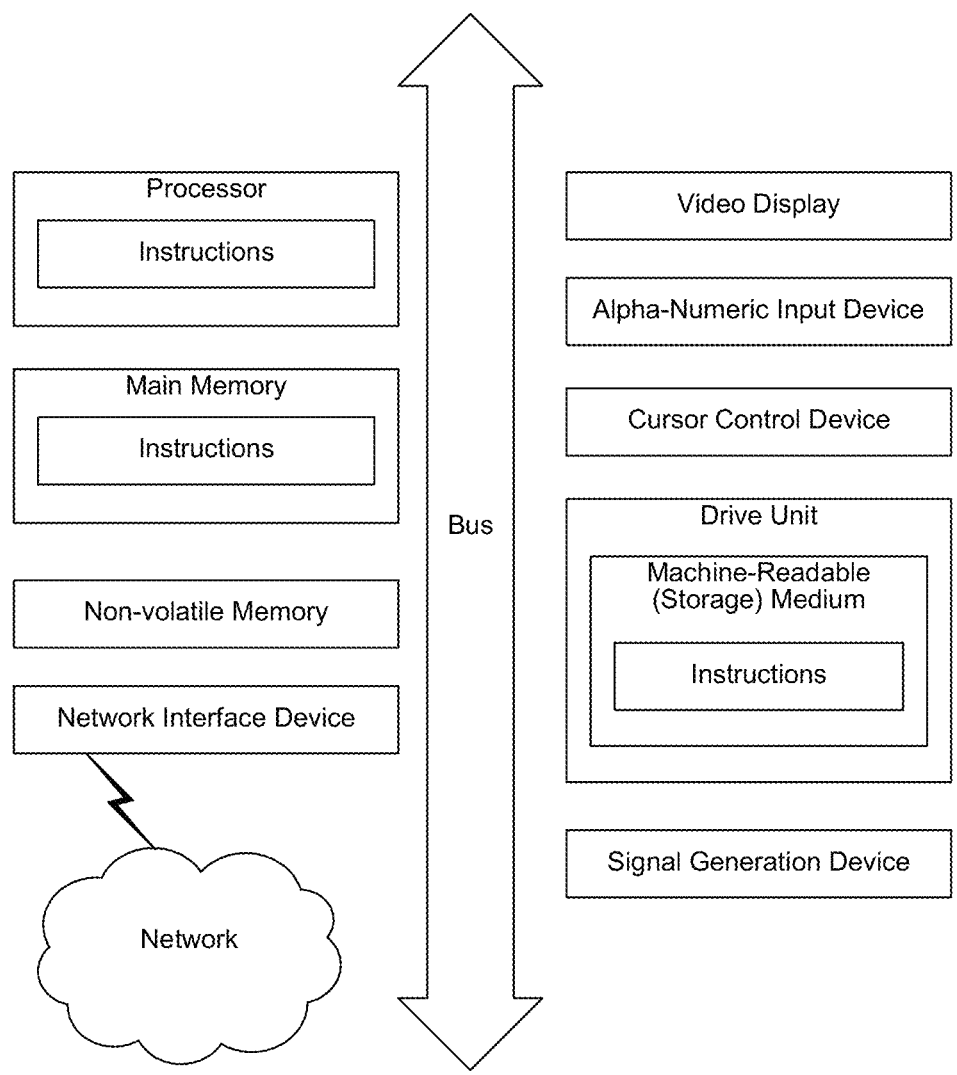
FIG. 10 illustrates an example of a computer system that can implement the data fusion system.

FIG. 10 illustrates, at a high level, an example of a hardware computing device on which any of the functional components described above can be implemented. Note that in some embodiments, various aspects of the technique introduced here can be performed in a distributed manner. For example, the various components and functions of the personal data fusion system may be implemented in two or more physically distinct computers and/or other types of devices. Hence, a "computer system" as described herein may be a distributed system, which may be implemented on a network or multiple networks.

In FIG. 10, the computer system includes a processor, memory, non-volatile memory, and an interface device. Various common components (e.g., cache memory) are omitted for illustrative simplicity. The computer system can be of any applicable known or convenient type. The components of the computer system can be coupled together via a bus or through some other known or convenient device.

This disclosure contemplates the computer system taking any suitable physical form. As an example, and not by way of limitation, the computer system may be an embedded computer system, a system-on-chip (SOC) system, a single-board computer (SBC) system (e.g., a computer-on-module (COM) or system-on-module (SOM) system), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer systems may include one or more computer systems; be unitary or distributed; span multiple locations; span multiple machines; or reside in a cloud, which may include one or more cloud components in one or more networks. Where appropriate, one or more computer systems may perform, without substantial spatial or temporal limitation, one or more steps of one or more methods described or illustrated herein. As an example, and not by way of limitation, one or more computer systems may perform, in real time or in batch mode, one or more steps of one or more methods described or illustrated herein. One or more computer systems may perform, at different times or at different locations, one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM) such as a CD-ROM, EPROM, or EEPROM, a magnetic or optical card, or another form of storage for large amounts of data. Some of this data is often written, by a direct memory access process, into memory during the execution of software in the computer. The non-volatile storage can be local, remote, or distributed. The non-volatile memory is optional, because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, it may be necessary to move the software to a computer-readable location appropriate for processing, and for illustrative purposes, that location is referred to as memory in this application. Even when software is moved to memory for execution, the processor will typically make use of hardware registers to store values associated with the software and make use of local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interfaces for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device. For simplicity, it is assumed that controllers of any devices not depicted in the example of FIG. 10 reside in the interface.

In operation, the computer system can be controlled by operating system software that includes a file management system, such as a disk operating system. One example of operating system software with associated file management system software is the family of operating systems known as Windows® from Microsoft Corporation of Redmond, Wash. and its associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, those skilled in the art will appreciate that throughout the description, discussions utilizing terms such as "processing" or "computing" or "calculating" or "determining" or "displaying" or "generating" or the like refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the machine operates as a stand-alone device or may be connected (e.g., networked) to other machines. In a networked deployment, the machine may operate in the capacity of a server or of a client machine in a client-server network environment or may operate as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" should also be taken to include any medium that is capable of storing, encoding, or carrying a set of instructions for execution by the machine and that causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine- or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing are intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

In addition to the above-mentioned examples, various other modifications and alterations of the introduced technique may be made without departing from the invention. Accordingly, the above disclosure is not to be considered as limiting and the appended claims are to be interpreted as encompassing the true spirit and the entire scope of the invention.

What is claimed is:

1. A method comprising:
   capturing, by a computer system, electronic communication data associated with an entity within an enterprise, the electronic communication data extracted from electronic communications transmitted over a network between a computing device associated with the entity and each of a plurality of computing devices associated with respective contacts of the entity;
   extracting, by the computer system, one or more features from each electronic communication;
   applying, by the computer system, a clustering algorithm to the extracted features to generate a plurality of clusters of the features;
   selecting, by the computer system, a feature corresponding to a cluster of the plurality of clusters as an objective of the entity;
   determining, by the computer system, whether the objective satisfies a specified criterion for a degree of importance to the entity;
   in response to a determination that the objective satisfies the specified criterion for the degree of importance to the entity, by the computer system, querying a data repository associated with the enterprise using the objective to identify an electronic resource for assisting the entity in achieving the objective; and
   sending, by the computer system, an indication of the electronic resource to the computing device associated with the entity for output to the entity.

2. The method of claim 1, wherein the objective is further determined using characteristics of the entity.

3. The method of claim 2, wherein the degree of importance to the entity is determined using communication characteristics associated with the electronic communication data.

4. The method of claim 3, wherein determining the degree of importance to the entity includes determining a timeliness measurement indicative of a time urgency in achieving the objective to the entity, and determining an importance level representing a significance in achieving the objective to the entity.

5. The method of claim 2, further comprising:
   receiving a first feedback response from the entity indicating quality of the provided resource.

6. The method of claim 5, further comprising:
   updating an entity profile responsive to the first feedback response.

7. The method of claim 6, further comprising:
   providing the objective to the entity; and
   receiving a second feedback response indicating quality of the objective.

8. The method of claim 7; wherein the specified criterion for the degree of importance to the entity is updated responsive to the second feedback response.

9. A system comprising:
   a processor; and
   a memory storing instructions, execution of which by the processor causes the system to:
   detect interactions by users with a plurality of electronic resources, the users associated with a plurality of entities and each entity having an objective;
   determine, based on the interactions, whether the plurality of electronic resources are relevant to the objectives of the entities;
   capture communication data associated with a selected entity, the communication data representing communication transmitted over a network between a computing device associated with the selected entity and a computing device associated with a contact of the selected entity,
   extract an objective of the selected entity from the communication data;
   determine whether the objective satisfies a specified criterion for a degree of importance to the selected entity;
   in response to a determination that the objective satisfies the specified criterion for the degree of importance to the entity, query a data repository using the objective to identify an electronic resource determined to be relevant to the objective for assisting the selected entity in achieving the objective; and
   provide an indication of the electronic resource to the selected entity.

10. The system of claim 9, wherein the objective is further determined using characteristics of the entity.

11. The system of claim 10, wherein the degree of importance to the entity is determined using communication characteristics associated with the communication data.

12. The system of claim 11, wherein determining the degree of importance to the entity includes determining a timeliness measurement indicative of a time urgency in achieving the objective to the entity, and determining an importance level representing a significance in achieving the objective to the entity.

13. The system of claim 10, wherein the memory includes further instructions execution of which by the processor causes the system to:
    receive a first feedback response from the entity indicating quality of the provided resource; and
    determine that the provided resource is relevant to the objective further based on the first feedback response.

14. The system of claim 13, wherein the memory includes further instructions execution of which by the processor causes the system to:
    update an entity profile responsive to the first feedback response.

15. The system of claim 14, wherein the memory includes further instructions execution of which by the processor causes the system to:
    provide the objective to the entity; and
    receive a second feedback response indicating quality of the objective.

16. The system of claim 15, wherein the specified criterion for the degree of importance to the entity is updated responsive to the second feedback response.

17. A computer program product including non-transitory computer-readable media storing computer program instructions, execution of which by a processor causes the processing system to perform operations comprising:
    capturing electronic communication data associated with an entity within an enterprise, the electronic communication data extracted from electronic communications transmitted over a network between a computing device associated with the entity and each of a plurality of computing devices associated with respective contacts of the entity;

extracting one or more feature vectors from the electronic communication data;

applying a clustering algorithm to the extracted feature vectors to determine an objective of the entity;

determining whether the objective satisfies a specified criterion for a degree of importance to the entity;

in response to a determination that the objective satisfies the specified criterion for the degree of importance to the entity, querying, by the computer system, a data repository associated with the enterprise using the objective to identify a resource for assisting the entity in achieving the objective; and providing an indication of the resource to the entity.

18. The computer program product of claim 17, wherein and the objective is further determined using characteristics of the entity.

19. The computer program product of claim 18, wherein the degree of importance to the entity is determined using communication characteristics associated with the communication data.

20. The computer program product of claim 19, wherein determining the degree of importance to the entity includes determining a timeliness measurement indicative of a time urgency in achieving the objective to the entity; and determining an importance level representing a significance in achieving the objective to the entity.

21. The computer program product of claim 18, wherein the non-transitory computer-readable media storing computer program instructions cause the processing system to further perform operations comprising:

receiving a first feedback response from the entity indicating quality of the provided resource; and storing the first feedback response as training data for use in training the relevance determination model.

22. The computer program product of claim 21, wherein the non-transitory computer-readable media storing computer program instructions cause the processing system to further perform operations comprising:

updating an entity profile responsive to the first feedback response.

23. The computer program product of claim 22, wherein the non-transitory computer-readable media storing computer program instructions cause the processing system to further perform operations comprising;

providing the objective to the entity; and receiving a second feedback response indicating quality of the objective.

24. The computer program product of claim 23, wherein the specified criterion for the degree of importance to the entity is updated responsive to the second feedback response.

* * * * *